United States Patent
Nakatani et al.

[11] Patent Number: 5,718,836
[45] Date of Patent: Feb. 17, 1998

[54] LIQUID COOLANT COMPOSITIONS WITH ANTI-CORROSIVE PROPERTY CONTAINING MAGNESIUM AND CALCIUM COMPOUNDS

[75] Inventors: Yoshitaka Nakatani; Masamine Tanikawa; Hisaki Ito, all of Aichi; Hideyuki Tami; Kazuhito Yaeda, both of Shizuoka, all of Japan

[73] Assignee: Japan Chemical Industries Co., Ltd., Japan

[21] Appl. No.: 559,199

[22] Filed: Nov. 13, 1995

Related U.S. Application Data

[63] Continuation-in-part of Ser. No. 384,075, Feb. 6, 1995, abandoned.

[30] Foreign Application Priority Data

May 12, 1994 [JP] Japan ................................ 6-098691

[51] Int. Cl.⁶ .................................................. C09K 5/00
[52] U.S. Cl. .............................. 252/74; 252/75; 252/76
[58] Field of Search ................................ 252/74, 75, 76

[56] References Cited

U.S. PATENT DOCUMENTS

| | | | |
|---|---|---|---|
| 3,228,884 | 1/1966 | Daignault et al. | 252/75 |
| 3,264,218 | 8/1966 | Daignault et al. | 252/75 |
| 4,452,715 | 6/1984 | Hirozawa | 252/75 |
| 4,717,495 | 1/1988 | Hercamp et al. | 252/75 |
| 5,100,571 | 3/1992 | Hartman | 252/75 |

FOREIGN PATENT DOCUMENTS 0552988  7/1993  European Pat. Off.

*Primary Examiner*—Christine Skane
*Attorney, Agent, or Firm*—Majestic, Parsons, Siebert & Hsue P.C.

[57] ABSTRACT

A liquid coolant composition with improved anti-corrosive property contains 85–99 weight % of an agent for lowering the melting point selected from the group consisting of alcohols and glycol, and 1–15 weight % of a rust preventive composition. The rust preventive composition contains 0.00005–0.02 weight % at elemental metal concentration of calcium compounds or a mixture of 0.00005–0.02 weight % each of calcium and magnesium compounds, and at least one kind of rust preventive selected from the group consisting of phosphates, borates, nitrates, molybdates, benzoates, silicates, triazoles, thiazoles, sebacic acid and octylic acid. Still better results are obtained if 0.001–0.02 weight % of at least one kind of polyphosphoric or polycarboxylic acids is additionally contained.

16 Claims, No Drawings

LIQUID COOLANT COMPOSITIONS WITH ANTI-CORROSIVE PROPERTY CONTAINING MAGNESIUM AND CALCIUM COMPOUNDS

This is a continuation-in-part of application Ser. No. 08/384,075, Feb. 6, 1995 now abandoned.

BACKGROUND OF THE INVENTION

This invention relates to liquid coolant compositions for mixing in cooling water for internal combustion engines of automobiles and the like for preventing the cooling water from freezing.

It has been known to prevent the freezing of cooling water for an automobile engine in the wintertime by adding to it a liquid coolant containing as its main ingredient an agent for lowering the melting point such as alcohols and glycols. Alcohols and glycols are not appropriate for this purpose, however, because they have no anti-corrosive property and are easily oxidized when they come into contact with oxygen while being circulated at a high temperature, the oxides thus formed accelerating the corrosion of the metal materials of the ducts for the cooling water. For this reason, rust preventives such as phosphates, borates, carbonates, sulfates, nitrates, molybdates, benzoates, silicates, benzotriazole, sodium mercaptobenzothiazole, tolyltriazole and triethanole amine are usually added to a liquid coolant such that corrosion of metal materials can be prevented when they are added to cooling water at a specified rate.

For the purpose of saving natural resources and energy, however, there are many machine parts made of aluminum that are coming to be used, and it is being realized that prior art cooling liquids do not have sufficient rust-preventing property against aluminum metal materials. For example, although borates show superior anti-corrosive property, they hardly have any effects on aluminum metal materials. As another example, although phosphates of triethanolamine have anti-corrosive effects against both iron and aluminum metal materials, nitrosamine is generated in the presence of a nitrite, adversely affecting the durability of their anti-corrosive property. As still another example, although silicates have anti-corrosive property against aluminum metal materials, they tend to become separated through gelation while they are being stored or used for an extended period of time such that their anti-corrosive property is again adversely affected.

In view of the above, Japanese Patent Publication Tokkai 1-306492 disclosed antifreezes using magnesium compounds and sodium salts of mercaptobenzothiazole as rust preventive and having pH in the range of 6.5–9.0. There are problems with these antifreezes, however, because their content of magnesium compounds is as high as 0.001–0.08 weight %, placing severe limitations on the amount by which other rust preventives can be added, and their cost is rather high.

As the power output of the engine is increased, furthermore, the surface temperature of its metal can become extremely high. If too much magnesium compounds are added to cooling water for such an engine, the amount of scale-like deposits on the engine head increases, and this can possibly adversely affect the ability of the engine to radiate off heat.

SUMMARY OF THE INVENTION

It is therefore an object of this invention to provide liquid coolant compositions with superior anti-corrosive property although only a small amount of rust preventives such as magnesium compounds is added.

Liquid coolant compositions embodying the present invention, with which the above and other objects can be accomplished, may be characterized as comprising an agent for lowering the melting point selected from alcohols and glycols, one or more rust preventives selected from phosphates, borates, nitrates, molybdates, benzoates, silicates, triazoles, thiazoles, sebacic acid and octylic acid, and a specified limited amount of calcium compounds either with or without magnesium compounds.

DETAILED DESCRIPTION OF THE INVENTION

This invention relates to liquid coolant compositions comprising 85–99 weight % of an agent for lowering the melting point selected from alcohols and glycols, and 1–15 weight % of a rust preventive composition of a specified kind. The rust preventive composition contains 0.00005–0.02 weight % (as metallic element concentration) of calcium compounds with or without magnesium compounds also by 0.00005–0.02 weight %, as well as one or more selected from phosphates, borates, nitrates, molybdates, benzoates, silicates, triazoles, thiazoles, sebacic acid and octylic acid, for example, of an alkali metal. Preferably, each of these phosphates, borates, nitrates, molybdates, benzoates, silicates, triazoles, thiazoles, sebacic acid and octylic acid is contained by less than 5.0 weight %. Preferably, furthermore, each of those selected components should be contained by 0.01 weight % or more in order to be effective.

Examples of alcohols and glycols serving as agent for lowering the melting point include methanol, ethanol, 2-propanol, monoethyleneglycol and propyleneglycol. They may be used singly or as a mixture of two or more kinds. Examples of calcium and magnesium compounds include their oxides, hydroxides, permanganates, chromates, fluorides, iodides, carbonates, nitrates, sulfates, titanates, tungstates, borates, phosphates, dihydrogen phosphates, formates, acetates, propionates, butyrates, valerates, laurates, stearates, oleates, glutamates, lactates, succinates, malates, tartrates, maleates, citrates, oxalates, malonates, sebacates, benzoates, phthalates, salicylates, and mandelates.

The liquid coolant according to this invention may contain up to 4.0 weight % of water. Its pH value is preferably in the range of 7.0–11.0. A stock solution for the liquid coolant according to this invention contains calcium compounds at 0.00005–0.02 weight % as metallic element concentration. If the concentration is below this range, its anti-corrosive effects deteriorate rapidly. If it is above this range, its effects are saturated, and it is not desirable to increase its concentration beyond this range because of the negative effects that the amount of other ingredients to be added becomes limited. An even more preferable range is 0.0002–0.01 weight %.

When both calcium and magnesium compounds are used together, the concentration of each should preferably be 0.00005–0.02 weight % as metallic element concentration, and the ratio at which they are to be mixed should be preferably about (calcium compounds)/(magnesium compounds)=½ as the ratio of the weights of their metallic elements.

As explained above, if an excessive amount of calcium and magnesium compounds is added, the production cost becomes high and there is also to be expected the possibility of the formation of scale-like deposits. For this reason, the rust preventive composition in a liquid coolant composition according to this invention preferably contains at least one selected from polyphosphoric acid and polycarboxylic acid because this addition makes it possible to obtain an equal level of anti-corrosive effects even if the amount of calcium or magnesium compounds to be added is reduced.

Examples of polyphosphoric acid include pyrophosphoric acid, tripolyphosphoric acid, 1-hydroxy ethylidene-1, 1-diphosphonic acid, amino trimethylene phosphonic acid, ethylene diamine tetramethylene phosphonic acid and phytic acid. Preferable among the examples of polycarboxylic acid are those in the form of oligomer or polymer such as polyacrylic acids, oligomaleic acid and maleic acid/acrylic acid copolymers.

Such polyphosphoric acid and/or polycarboxylic acid should preferably be added at a rate of 0.001–0.02 weight % as the total. If the added amount is less than 0.001 weight %, the desired effects cannot be obtained. If the added amount is greater than 0.02 weight %, their effects are saturated, and it is not desirable to increase the added amount any further because the amount of other ingredients to be added becomes limited.

Liquid coolant compositions according to this invention are normally mixed into cooling water at a rate of 20–60 volume %. Containing calcium compounds with or without magnesium compounds at a specified rate, liquid coolant compositions according to this invention have improved anti-corrosive property although it is not clearly understood why. According to the present invention, an equal level of anti-corrosive property can be obtained by using less calcium or magnesium compounds as compared to prior art coolant compositions. If calcium or magnesium compounds are used at about the same ratio, the present invention can provide much improved anti-corrosive capability.

If both calcium and magnesium compounds are used together, furthermore, the same level of anti-corrosive property can be obtained as with prior art compositions by using an even smaller total amount. If the same total amount is used, the anti-corrosive effects are even further improved.

If at least one selected from polyphosphoric acids and polycarboxylic acids is used in addition to calcium compounds with or without magnesium compounds, the same level of anti-corrosive property can be obtain even if the amount of calcium and/or magnesium compounds to be added is reduced further.

In what follows, the invention will be described by way of test examples and comparison examples. Unless specifically stated, "%" will mean "weight %".

Part 1

Test Example 1

A liquid coolant composition Test Example 1 was prepared by mixing monoethyleneglycol at 90%, water at 1.9859%, sodium nitrate at 0.4%, sodium molybdate at 0.5%, benzotriazole at 0.4%, sodium benzoate at 5.0%, mercaptobenzothiazole at 0.2%, orthophosphoric acid 0.8%, potassium hydroxide at 0.7% and calcium nitrate tetrahydrate at 0.0141% (metal calcium concentration=0.0024%) as shown in Table 1. A corrosion test was carried out on this liquid coolant composition according to ASTM D4340-84 (Corrosion of Cast Aluminum Alloys in Engine Coolants Under Heat-Rejecting Conditions). The measured corrosion and evaluation of the external appearance are shown in Table 1. The pH of coolant was measured both before and after the test. The results are also shown in Table 1. The test conditions were as summarized below:

| Concentration of liquid coolant: | 25 volume % |
|---|---|
| Sample: | Cast aluminum alloy (AC-2A) |
| Sample Temperature: | 135° C. |
| Liquid Quantity: | 500 ml |
| Test Time: | 168 Hr |
| Amount of Cl⁻ in Test Liquid: | 100 ppm |
| Pressure: | 193 kpa |

Test Example 2

Test Example 2 is the same as Test Example 1 except that calcium nitrate tetrahydrate concentration was 0.0212% (or 0.0036% as metal calcium concentration). Tests were carried out as with Test Example 1. The results are shown in Table 1.

Test Example 3

Test Example 3 is the same as Test Example 1 except that calcium sulfate dihydrate was used at 0.0052% (or 0.0012% as metal calcium concentration) instead of calcium nitrate tetrahydrate. Tests were carried out similarly. The test results are shown in Table 1.

Test Example 4

Test Example 4 is the same as Test Example 1 except that calcium sulfate dihydrate was used at 0.0303% (or 0.0072% as metal calcium concentration) instead of calcium nitrate tetrahydrate. Tests were carried out similarly. The test results are shown in Table 1.

Test Example 5

Test Example 5 is the same as Test Example 1 except that calcium nitrate tetrahydrate was used at 0.0012% (or 0.0002% as metal calcium concentration) and magnesium nitrate hexahydrate was used at 0.0042% (or 0.0004% as metal magnesium concentration). Tests were carried out similarly. The test results are shown in Table 1.

Test Example 6

Test Example 6 is the same as Test Example 1 except that calcium nitrate tetrahydrate was used at 0.0035% (or 0.0006% as metal calcium concentration) and magnesium nitrate hexahydrate was used at 0.0127% (or 0.0012% as metal magnesium concentration). Tests were carried out similarly. The test results are shown in Table 1.

Test Example 7

Test Example 7 is the same as Test Example 1 except that calcium nitrate tetrahydrate was used at 0.0071% (or 0.0012% as metal calcium concentration) and magnesium nitrate hexahydrate was used at 0.0253% (or 0.0024% as metal magnesium concentration). Tests were carried out similarly. The test results are shown in Table 1.

Test Example 8

Still another liquid coolant composition test Example 8 was prepared by mixing monoethyleneglycol at 95%, water at 2.7176%, calcium nitrate tetrahydrate 0.0071% (or 0.0012% as metal calcium concentration), magnesium nitrate hexahydrate at 0.0253% (or 0.0024% as metal magnesium concentration), sodium nitrate at 0.25%, tolyltriazole at 0.1%, orthophosphoric acid at 0.6%, potassium hydroxide at 0.65%, sodium silicate at 0.35% and sodium tetraborate at 0.3% as shown in Table 1. Tests were carried out as with Test Example 1. The test results are shown in Table 1.

Test Example 9

Still another liquid coolant composition test Example 9 was prepared by mixing monoethyleneglycol at 90.0%, water at 2.9676%, calcium nitrate tetrahydrate 0.0071% (or 0.0012% as metal calcium concentration), magnesium nitrate hexahydrate at 0.0253% (or 0.0024% as metal magnesium concentration), sodium nitrate at 0.25%, benzotriazole at 0.1%, sodium hydroxide at 1.3%, sodium silicate at 0.15%, sodium tetraborate at 1.2%, sebacic acid at 1.5% and octylic acid at 2.5% as shown in Table 1. Tests were carried out as with Test Example 1. The test results are shown in Table 1.

Comparison Example 1

Comparison Example 1 is the same as Test Example 1 except that it does not contain any calcium or magnesium compounds. Tests were carried out similarly, and the test results are shown in Table 1.

Comparison Example 2

Comparison Example 2 is the same as Test Example 8 except that it does not contain any calcium or magnesium compounds. Tests were carried out similarly, and the test results are shown in Table 1.

Comparison Example 3

Comparison Example 3 is the same as Test Example 9 except that it does not contain any calcium or magnesium compounds. Tests were carried out similarly, and the test results are shown in Table 1.

Comparison Example 4

Comparison Example 4 is the same as Test Example 1 except that magnesium nitrate hexahydrate was used at 0.0253% (or 0.0024% as metal magnesium concentration) instead of calcium compounds. Tests were carried out similarly, and the test results are shown in Table 1.

Comparison Example 5

Comparison Example 5 is the same as Test Example 1 except that magnesium nitrate hexahydrate was used at 0.0759% (or 0.0072% as metal magnesium concentration) instead of calcium compounds. Tests were carried out similarly, and the test results are shown in Table 1.

TABLE 1

| | Comparison Examples | | | | |
|---|---|---|---|---|---|
| | 1 | 2 | 3 | 4 | 5 |
| Calcium sulfate dihydrate (as elemental Ca) | — | — | — | — | — |
| Calcium nitrate tetrahydrate (as elemental Ca) | — | — | — | — | — |
| Magnesium nitrate hexahydrate (as elemental Mg) | — | — | — | 0.0253 0.0024 | 0.0759 0.0072 |
| Sodium nitrate | 0.4 | 0.25 | 0.25 | 0.4 | 0.4 |
| Sodium molybdate | 0.5 | — | — | 0.5 | 0.5 |
| Benzotriazole | 0.4 | — | 0.1 | 0.4 | 0.4 |
| Tolyltriazole | — | 0.1 | — | — | — |
| Sodium benzoate | 5.0 | — | — | 5.0 | 5.0 |
| Mercaptobenzothiazole | 0.2 | — | — | 0.2 | 0.2 |
| Orthophosphoric acid | 0.8 | 0.6 | — | 0.8 | 0.8 |
| Potassium hydroxide | 0.7 | 0.65 | — | 0.7 | 0.7 |
| Sodium hydroxide | — | — | 1.3 | — | — |
| Sodium silicate | — | 0.35 | 0.15 | — | — |
| Sodium tetraborate | — | 0.3 | 1.2 | — | — |
| Sebacic acid | — | — | 1.5 | — | — |
| Octylic acid | — | — | 2.5 | — | — |
| Water | 2.0 | 2.75 | 3.0 | 1.9747 | 1.9241 |
| Monoethylene glycol | 90.0 | 95.0 | 90.0 | 90.0 | 90.0 |
| Corrosion (mg/cm$^2$) | 0.92 | 21.73 | 6.37 | 0.47 | 0.07 |
| Appearance | Became black | Became black | Became black | Became black | Slight color change |
| pH before test | 7.3 | 10.9 | 8.4 | 7.3 | 7.3 |
| pH after test | 7.3 | 10.6 | 8.5 | 7.3 | 7.2 |

| | Test Examples | | | | | | | | |
|---|---|---|---|---|---|---|---|---|---|
| | 1 | 2 | 3 | 4 | 5 | 6 | 7 | 8 | 9 |
| Calcium sulfate dihydrate (as elemental Ca) | — | — | 0.0052 0.0012 | 0.0303 0.0072 | — | — | — | — | — |

TABLE 1-continued

| | | | | | | | | | |
|---|---|---|---|---|---|---|---|---|---|
| Calcium nitrate tetrahydrate | 0.0141 | 0.0212 | — | — | 0.0012 | 0.0035 | 0.0071 | 0.0071 | 0.0071 |
| (as elemental Ca) | 0.0024 | 0.0036 | | | 0.0002 | 0.0006 | 0.0012 | 0.0012 | 0.0012 |
| Magnesium nitrate hexahydrate | — | — | — | — | 0.0042 | 0.0127 | 0.0253 | 0.0253 | 0.0253 |
| (as elemental Mg) | | | | | 0.0004 | 0.0012 | 0.0024 | 0.0024 | 0.0024 |
| Sodium nitrate | 0.4 | 0.4 | 0.4 | 0.4 | 0.4 | 0.4 | 0.4 | 0.25 | 0.25 |
| Sodium molybdate | 0.5 | 0.5 | 0.5 | 0.5 | 0.5 | 0.5 | 0.5 | — | — |
| Benzotriazole | 0.4 | 0.4 | 0.4 | 0.4 | 0.4 | 0.4 | 0.4 | — | 0.1 |
| Tolyltriazole | — | — | — | — | — | — | — | 0.1 | — |
| Sodium benzoate | 5.0 | 5.0 | 5.0 | 5.0 | 5.0 | 5.0 | 5.0 | — | — |
| Mercaptobenzothiazole | 0.2 | 0.2 | 0.2 | 0.2 | 0.2 | 0.2 | 0.2 | — | — |
| Orthophosphoric acid | 0.8 | 0.8 | 0.8 | 0.8 | 0.8 | 0.8 | 0.8 | 0.6 | — |
| Potassium hydroxide | 0.7 | 0.7 | 0.7 | 0.7 | 0.7 | 0.7 | 0.7 | 0.65 | — |
| Sodium hydroxide | — | — | — | — | — | — | — | — | 1.3 |
| Sodium silicate | — | — | — | — | — | — | — | 0.35 | 0.15 |
| Sodium tetraborate | — | — | — | — | — | — | — | 0.3 | 1.2 |
| Sebacic acid | — | — | — | — | — | — | — | — | 1.5 |
| Octylic acid | — | — | — | — | — | — | — | — | 2.5 |
| Water | 1.9859 | 1.9788 | 1.9948 | 1.9607 | 1.9946 | 1.9838 | 1.9676 | 2.7176 | 2.9676 |
| Monoethylene glycol | 90.0 | 90.0 | 90.0 | 90.0 | 90.0 | 90.0 | 90.0 | 95.0 | 90.0 |
| Corrosion (mg/cm$^2$) | 0.19 | 0.18 | 0.23 | 0.17 | 0.45 | 0 | 0 | 0.06 | 0 |
| Appearance | Slight color change | Slight color change | Slight color change | Slight color change | Slight color change | No color change | No color change | No color change | No color change |
| pH before test | 7.3 | 7.3 | 7.3 | 7.3 | 7.3 | 7.3 | 7.3 | 10.9 | 8.4 |
| pH after test | 7.2 | 7.2 | 7.2 | 7.2 | 7.2 | 7.2 | 7.3 | 10.0 | 8.5 |

It can be understood, by comparing Test Examples 1–4 with Comparison Examples 1–4, that the degree of corrosion can be significantly reduced by the addition of even smaller amounts of calcium compounds than magnesium compounds and hence that calcium compounds are more effective than magnesium compounds. Among calcium compounds, it can also be understood that the sulfate is more effective than the nitrate and hardly brings about any changes in the external appearance on test samples.

A comparison with Test Examples 5–7 also makes it clear that the degree of corrosion is even more significantly reduced if calcium and magnesium compounds are used together even if their total amount is reduced. The favorable effects of using them together are most clearly seen by comparing Comparison Example 2 with Test Example 8 and Comparison Example 3 with Test Example 9.

Since there is hardly any change in the pH value before and after the tests, it may be concluded that no wasteful reaction has taken place in the liquid coolants of both Test and Comparison Examples and hence that they can be used over an extended period of time.

Part 2

Test Example 10

Still another liquid coolant composition Test Example 11 was prepared by mixing monoethyleneglycol at 90%, water at 1.9476%, sodium nitrate at 0.4%, sodium molybdate at 0.5%, benzotriazole at 0.4%, sodium benzoate at 5.0%, mercaptobenzothiazole at 0.2%, orthophosphoric acid 0.8%, potassium hydroxide at 0.7%, calcium nitrate tetrahydrate at 0.0071% (metal calcium concentration=0.0012%), magnesium nitrate hexahydrate at 0.0253% (metal magnesium concentration=0.0024%) and 1-hydroxyethylidene-1,1-diphosphonic acid at 0.02% as shown in Table 2. A corrosion test was carried out on this liquid coolant composition according to ASTM D4340-84 (Corrosion of Cast Aluminum Alloys in Engine Coolants Under Heat-Rejecting Conditions). The measured corrosion and evaluation of the external appearance are shown in Table 2. The test conditions were as summarized below:

| | |
|---|---|
| Concentration of liquid coolant: | 25 volume % |
| Sample: | Cast aluminum alloy (AC-2A) |
| Sample Temperature: | 135° C. or 170 ° C. |
| Liquid Quantity: | 500 ml |
| Test Time: | 168 Hr |
| Amount of Cl$^-$ in Test Liquid: | 100 ppm |
| Pressure: | 193 kPa |

Although the temperature condition according to the ASTM method is 135° C., the tests were repeated at 170° C. in order to test the effects of a more severe condition. The pH of the aqueous solution containing this liquid coolant composition at 30 volume % was 7.3.

Test Example 11

Test Example 11 is the same as Test Example 10 except that calcium nitrate tetrahydrate concentration was 0.0213% (or 0.0036% as metal calcium concentration) and that no magnesium compound was used. Tests were carried out as above. The test results are shown in Table 2. The pH of the aqueous solution containing this liquid coolant composition at 30 volume % was 7.3.

Test Example 12

Test Example 12 is the same as Test Example 10 except that magnesium nitrate hexahydrate was used at 0.0759% (or 0.0072% as metal magnesium concentration) and that no calcium compound was used. Tests were carried out as above. The test results are shown in Table 2. The pH of the aqueous solution containing this liquid coolant composition at 30 volume % was 7.3.

Test Example 13

Test Example 13 is the same as Test Example 10 except that 1-hydroxyethylidene-1,1-diphosphonic acid was not used, calcium nitrate tetrahydrate was used at 0.0213% (or 0.0036% as metal calcium concentration) and magnesium nitrate hexahydrate was used at 0.0739% (or 0.0072% as metal magnesium concentration). Tests were carried out as above. The test results are shown in Table 2. The pH of the aqueous solution containing this liquid coolant composition at 30 volume % was 7.3.

Comparison Example 6

Comparison Example 6 is the same as Test Example 10 except that no calcium or magnesium compounds were used.

Tests were carried out similarly. The test results are shown in Table 2. The pH of the aqueous solution containing this liquid coolant composition at 30 volume % was 7.3.

Test Examples 14–18

These examples were used for investigating the effects of polyphosphoric and polycarboxylic acids when there contents are small.

TABLE 2

|  | Comparison Example 1 | Comparison Example 6 | Test Example 2 | Comparison Example 5 | Test Example 7 | Test Example 13 | Test Example 10 | Test Example 11 | Test Example 12 |
|---|---|---|---|---|---|---|---|---|---|
| 1-hydroxyethylidene-1,1-diphosphonic acid | — | 0.02 | — | — | — | — | 0.02 | 0.02 | 0.02 |
| Polyacrylic acid (average molecular weight 5000) | — | — | — | — | — | — | — | — | — |
| Calcium nitrate tetrahydrate | — | — | 0.0213 | — | 0.0071 | 0.0213 | 0.0071 | 0.0213 | — |
| (as elemental Ca) | — | — | 0.0036 | — | 0.0012 | 0.0036 | 0.0012 | 0.0036 | — |
| Magnesium nitrate hexahydrate | — | — | — | 0.0759 | 0.0253 | 0.0759 | 0.0253 | — | 0.0759 |
| (as elemental Mg) | — | — | — | 0.0072 | 0.0024 | 0.0072 | 0.0024 | — | 0.0072 |
| Sodium nitrate | 0.4 | 0.4 | 0.4 | 0.4 | 0.4 | 0.4 | 0.4 | 0.4 | 0.4 |
| Sodium molybdate | 0.5 | 0.5 | 0.5 | 0.5 | 0.5 | 0.5 | 0.5 | 0.5 | 0.5 |
| Benzotriazole | 0.4 | 0.4 | 0.4 | 0.4 | 0.4 | 0.4 | 0.4 | 0.4 | 0.4 |
| Sodium benzoate | 5.0 | 5.0 | 5.0 | 5.0 | 5.0 | 5.0 | 5.0 | 5.0 | 5.0 |
| Mercaptobenzothiazole | 0.2 | 0.2 | 0.2 | 0.2 | 0.2 | 0.2 | 0.2 | 0.2 | 0.2 |
| Orthophosphoric acid | 0.8 | 0.8 | 0.8 | 0.8 | 0.8 | 0.8 | 0.8 | 0.8 | 0.8 |
| Potassium hydroxide | 0.7 | 0.7 | 0.7 | 0.7 | 0.7 | 0.7 | 0.7 | 0.7 | 0.7 |
| Water | 2.0 | 1.98 | 1.9787 | 1.9241 | 1.9676 | 1.9028 | 1.9476 | 1.9587 | 1.9041 |
| Monoethylene glycol | 90.0 | 90.0 | 90.0 | 90.0 | 90.0 | 90.0 | 90.0 | 90.0 | 90.0 |
| At 135° C. | | | | | | | | | |
| Corrosion (mg/cm$^2$) | 0.92 | 0. | 0.18 | 0.07 | 0. | 0. | 0. | | |
| Appearance | Became black | Became black | Slight color change | Became slightly black | No color change | No color change | No color change | No color change | No color change |
| At 170° C. | | | | | | | | | |
| Corrosion (mg/cm$^2$) | 25.01 | 24.66 | 4.73 | 0.79 | 24.37 | 0 | 0 | 2.20 | 0 |
| Appearance | Became black | Became black | Became black | Became black | Became black | No color change | No color change | Became black | No color change |

|  | Test Example 14 | Test Example 15 | Test Example 16 | Test Example 17 | Test Example 18 |
|---|---|---|---|---|---|
| 1-hydroxyethylidene-1,1-diphosphonic acid | 0.0005 | 0.005 | — | — | 0.0025 |
| Polyacrylic acid (average molecular weight 5000) | — | — | 0.0001 | 0.001 | 0.0005 |
| Calcium nitrate tetrahydrate | 0.0006 | 0.0012 | 0.0006 | 0.0012 | 0.00#8 |
| (as elemental Ca) | 0.0001 | 0.0002 | 0.0001 | 0.0002 | 0.0003 |
| Magnesium nitrate hexahydrate | 0.0021 | 0.0042 | 0.0021 | 0.0042 | 0.0063 |
| (as elemental Mg) | 0.0002 | 0.0004 | 0.0002 | 0.0004 | 0.0006 |
| Sodium nitrate | 0.4 | 0.4 | 0.4 | 0.4 | 0.4 |
| Sodium molybdate | 0.5 | 0.5 | 0.5 | 0.5 | |
| Benzotriazole | 0.4 | 0.4 | 0.4 | 0.4 | 0.4 |
| Sodium benzoate | 5.0 | 5.0 | 5.0 | 5.0 | 5.0 |
| Mercaptobenzothiazole | 0.2 | 0.2 | 0.2 | 0.2 | 0.2 |
| Orthophosphoric acid | 0.8 | 0.8 | 0.8 | 0.8 | 0.8 |
| Potassium hydroxide | 0.7 | 0.7 | 0.7 | 0.7 | 0.7 |
| Water | 1.9968 | 1.9896 | 1.9972 | 1.9936 | 1.9989 |
| Monoethylene glycol | 90.0 | 90.0 | 90.0 | 90.0 | 90.0 |

TABLE 2-continued

| At 135° C. | | | | | |
|---|---|---|---|---|---|
| Corrosion (mg/cm²) | 0.65 | 0. | 0.40 | 0. | 0. |
| Appearance | Slight color change | No color change | Slight color change | No color change | No color change |
| At 170° C. | | | | | |
| Corrosion (mg/cm²) | 26.21 | 0. | 24.99 | 0. | 0. |
| Appearance | Became black | No color change | Became black | No color change | No color change |

It can be understood, by comparing Test and Comparison Examples shown in Table 2, that corrosion can be reduced even in tests under a severe condition if calcium compounds with or without magnesium compounds are used together with 1-hydroxyethylidene-1,1-diphosphonic acid and/or polyacrylic acid. As indicated in Test Examples 14 and 16, corrosion cannot be reduced if the amount of 1-hydroxyethylidene-1,1-diphosphonic acid or polyacrylic acid which is used is extremely small. The synergistic effects of the co-existence of polyphosphoric acid or polycarboxylic acid and calcium or magnesium compounds is clearly demonstrated.

Although a comparison between Test Examples 7 and 13 indicates that anti-corrosion property can be improved also by increasing the contents of calcium and magnesium compounds, the use of Test Example 13 leaves one in the fear of the possibility of the formation of scale-like deposits. The present invention teaches, however, that similar anti-corrosive effects can be obtained by the coexistence of polyphosphoric acid or polycarboxylic acid with calcium or magnesium compounds even if the amount of calcium or magnesium compounds to be added is reduced. In other words, the present invention makes it possible to prevent the formation of scale-like deposits such that thermal radiation capability of engines can be caused to last for a more extended period of time.

In summary, liquid coolant compositions according to this invention can dependably prevent the corrosion of aluminum metals. Since high anti-corrosive capability can be obtained with the addition of only a small amount of calcium compounds, there is an added degree of freedom of choice, for example, in the amounts of other ingredients to be added. This degree of freedom becomes even higher if both calcium and magnesium compounds are used together. Thus, different liquid coolant compositions can be designed, depending on the purpose of their use. The number of steps for their manufacturing can also be reduced and hence the manufacturing costs can be reduced.

Since liquid coolant compositions of the present invention contain polyphosphoric acid or polycarboxylic acid together with at least one selected from calcium or magnesium compounds, their anti-corrosive property is as good with a reduced amount of calcium or magnesium compounds as if a larger amount of calcium or magnesium compounds were added. As a result, the formation of scale-like deposits can be prevented and engines can be allowed to maintain their thermal radiation property for an extended period of time.

What is claimed is:

1. A liquid coolant composition comprising:
   85–99 weight % of water selected from the group consisting of alcohols and glycols; and
   1–15 weight % of a rust preventive composition which contains both calcium nitrate and magnesium nitrate and at least one rust preventative selected from the group consisting of phosphates, borates, nitrates, molybdates, benzoates, silicates, triazoles, thiazoles, sebacic acid and octylic acid, said calcium nitrate and said magnesium nitrate together being contained by 0.00005–0.01 weight % at elemental metal concentration.

2. The liquid coolant composition of claim 1 wherein the amount of said calcium nitrate and magnesium nitrate at elemental metal concentration is 0.00005–0.005 weight %.

3. The liquid coolant composition of claim 1 containing said calcium nitrate and said magnesium nitrate at weight ratio of about ½.

4. The liquid coolant composition of claim 2 containing said calcium nitrate and said magnesium nitrate at weight ratio of about ½.

5. The liquid coolant composition of claim 1 wherein said rust preventive composition further contains 0.001–0.02 weight % of at at least one acid selected from the group consisting of polyphosphoric acids and polycarboxylic acids.

6. The liquid coolant composition of claim 2 wherein said rust preventive composition further contains 0.001–0.02 weight % of at at least one acid selected from the group consisting of polyphosphoric acids and polycarboxylic acids.

7. The liquid coolant composition of claim 1 wherein each of said at least one rust preventative is contained by less than 5 weight %.

8. The liquid coolant composition of claim 1 further comprising less than 4 weight % of water.

9. The liquid coolant composition of claim 1 having pH value between 7.0 and 11.0.

10. The liquid coolant composition of claim 5 wherein each of said at least one rust preventative is contained by less than 5 weight %.

11. The liquid coolant composition of claim 6 wherein each of said at least one rust preventative is contained by less than 5 weight %.

12. The liquid coolant composition of claim 5 further comprising less than 4 weight % of water.

13. The liquid coolant composition of claim 6 further comprising less than 4 weight % of water.

14. The liquid coolant composition of claim 5 having pH value between 7.0 and 11.0.

15. The liquid coolant composition of claim 6 having pH value between 7.0 and 11.0.

16. The liquid coolant composition of claim 5 containing said calcium nitrate and said magnesium nitrate at weight ratio of about ½.

* * * * *

UNITED STATES PATENT AND TRADEMARK OFFICE
CERTIFICATE OF CORRECTION

PATENT NO. : 5,718,836
DATED : February 17, 1998
INVENTOR(S) : Yoshitaka Nakatani et al.

It is certified that error appears in the above-identified patent and that said Letters Patent is hereby corrected as shown below:

Column 10, Table 2, Line 54:

Replace: "Calcium nitrate 0.0006 0.0012 0.0006 0.0012 0.00#8"

With: --Calcium nitrate 0.0006 0.0012 0.0006 0.0012 0.0018--

Column 12, Claim 5, Line 33:

Replace: "0,001-0,02"

With: --0.001-0.02--

Signed and Sealed this

Seventeenth Day of August, 1999

Attest:

Attesting Officer

Q. TODD DICKINSON

Acting Commissioner of Patents and Trademarks